United States Patent Office 2,701,833
Patented Feb. 8, 1955

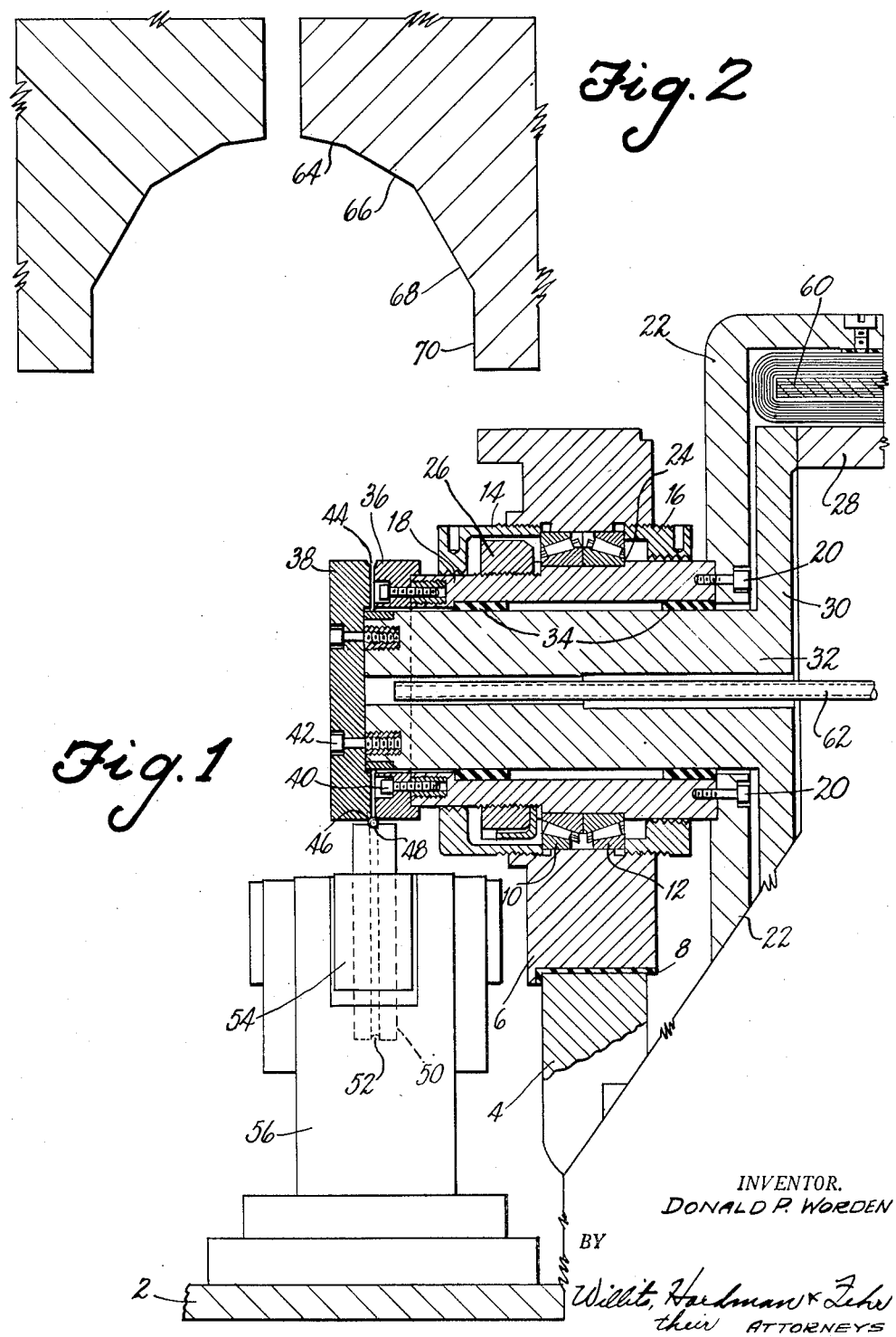

2,701,833

HIGH FREQUENCY WELDER

Donald P. Worden, Rochester, N. Y., assignor to General Motors Corporation, Detroit, Mich., a corporation of Delaware Application July 19, 1952, Serial No. 299,822

3 Claims. (Cl. 219—6)

This invention relates to a welding apparatus for welding the abutting edges of a tubular or cylindrical element which is formed by bending a flat piece of metal into tubular or cylindrical form and most particularly to a welding apparatus used in welding the abutting edges of steel tubing formed by continuously feeding a flat strip of steel through bending and shaping devices which continuously bend the flat strip into a tube with abutting edges and which, after it is formed, is moved continuously through a welding apparatus to weld the abutting edges together, thus forming a complete tube. A welding device employed to weld tubing formed in this manner is disclosed in the copending application of Worden et al. S. N. 234,184 filed June 29, 1951, now Pat. No. 2,680,181, dated June 1, 1954, and for convenience the present invention is illustrated herein as being embodied in the particular welding device which is disclosed in such application. However, the present invention has no particular relation to or cooperation with the specific welding apparatus disclosed.

In welding apparatus which has been previously employed to weld tubing, such as that disclosed in the application above referred to or in the patent to Nichols, 2,293,846, two rotating electrode disks separated by an air gap or by insulation are employed and the inner edges of these disks, adjacent the air gap or insulation, are cut away to form a groove in which the tubing to be welded is received as it is moved past the welding apparatus during the welding operation. A corresponding groove is formed in a pressure roller which holds the tubing in contact with the electrodes with whatever degree of pressure is desired.

It is essential that the tubing be held in proper alignment with respect to the space between the electrodes during the welding operation, with the abutting edges which are to be welded opposite such space. It was found that if the tubing was in cylindrical form during the welding operation, it was diffiuclt to prevent rotation of the tubing so that it was the practice to form the tubing in elliptical shape before the welding operation was carried out, in order to prevent possible rotation of the tubing as it moved past the welder, and then to reform it into true cylindrical shape after it was welded. This required additional shaping operations which incur additional expense and it is the object of the present invention to provide means to prevent rotation of the cylindrical tubing during the welding operation so that such tubing can be held with the seam to be welded in proper alignment with respect to the welding electrodes and the welding operation can be successfully carried out on a tube of true cylindrical form.

According to the present invention, this object is accomplished by the provision of flat surfaces on the cutaway portions of the electrode disks which form the tube receiving groove which lie in planes at different angles to the axis of said disks.

Further objects and advantages of the present invention will be apparent from the following description, reference being had to the accompanying drawings wherein a preferred embodiment of the present invention is clearly shown.

In the drawings:

Figure 1 is a fragmentary section showing a part of a welding apparatus in which the present invention is embodied.

Figure 2 is an enlarged fragmentary section of a part of the welding electrodes showing the formation of the tube receiving groove surfaces.

As already stated, the particular construction of the welding apparatus is not at all material to the present invention and for illustrative purposes there is shown herein only sufficient of the device which is disclosed in the aforementioned application of Worden et al. to facilitate complete understanding of the invention. As shown, a part of a supporting table is indicated at 2. Secured thereto in any suitable way and extending upwardly is a supporting frame on which the welding apparatus is supported, a part of this frame being numbered 4. Suitably secured to the frame 4 by any conventional means is a member 6, separated from the frame 4 by insulating material 8, and serving as a support for roller bearings 10 and 12 which are retained in position by nuts 14 and 16 screwed into the member 6 to clamp the bearings in proper position.

Rotatable in the bearings is a tubular shaft 18 connected by screws 20 to a drum 22 which is suitably connected at the opposite end (not shown) to a rotating shaft. The shaft 18 and drum 22 are held against axial movement with respect to the bearings 10 and 12 by a shoulder 24 and a nut 26. An inner drum 28 which at the end not shown is connected to the aforementioned rotating shaft is also connected in any suitable way to a flange 30 integral with a shaft 32 which is supported by and located within the shaft 18, being separated from shaft 18 by non-conducting rings 34.

The shafts 18 and 32 rotate together and support respectively copper electrode disks 36 and 38 which are secured to shafts 18 and 32 by screws 40 and 42 respectively and separated by an air gap 44. The inner edges of the disks 36 and 38 are cut away to form a peripheral groove 46 adapted to receive the tubing 48 during the welding operation. The tubing is held against the electrode surfaces during the welding operation by a pressure roll 50 which has a groove 52 in the periphery thereof to receive the tubing 48 when it is in engagement with the electrodes. The pressure roll 50 is suitably mounted for rotation on an arm 54 pivotally mounted on a standard 56 carried by the supporting table 2 and urged toward the electrodes by any suitable means for applying a substantially constant pressure thereto. The construction of the pressure roll and its operating means forms no part of the present invention and may be of any suitable construction, as for example, that shown in the patent to Hahn et al. 2,492,572 granted December 27, 1949.

The two drums 22 and 28 form the secondary of the transformer while in the annular space between the drums the primary winding 60 of the transformer is located. The construction of this winding need not be described herein as the particular form of the transformer has nothing to do with the invention claimed herein. The construction can be that of the application of Worden et al. previously referred to, which, as a matter of convenience is shown herein, or it could be something entirely different as in the Nichols patent, supra.

The element 62 is a pipe for supplying water to the interior of drum 28 through which water is continuously circulated for cooling purposes.

All of the mechanism, which has been somewhat briefly described in the foregoing, is fully shown and described in detail in the above-mentioned application S. N. 234,184.

It will be understood that rotation of the electrodes during the welding operation is effected by the longitudinally moving tubing which is continuously moved by the tube forming devices, and the electrodes as the tubing is fed past the welding device by the tube forming means. The traction is effective to move the electrodes as described because the pressure roll 50 is urged against the tubing with sufficient force to accomplish this action.

In the device of such application the cut-away surfaces of the electrodes 36 and 38 which form the tube receiving groove are cut away on an arc which is substantially a part of a circle so that the peripheral groove adjacent the space between the electrodes, at any selected point throughout its entire length, is approximately semicircular in cross-section. As previously stated, it was difficult to hold the tube to be welded against rotation in the groove when a groove of such shape was employed. Possibly, tendency of the tubing to rotate might be eliminated if sufficient pressure is exerted by roll 50 on the tubing, but there are practical limitations with respect to the pressure which can be applied, as the welding operation is unsatisfactory if either too little or too much pressure is applied. Therefore, the tubing cannot be prevented from rotating during the welding operation simply by increasing the pressure applied to the tubing, as it moves past the welding electrodes.

According to the present invention, the desired result is accomplished by forming the groove with a series of flat surfaces 64, 66, 68 and 70 on the cut-away portions of the electrodes which constitute the groove of such surfaces, as shown, being at angles of approximately 9°, 30°, 60° and 90° to the axes of the electrodes. With the electrodes formed in this manner, rotation of the tubing during the welding operation is prevented without increasing the pressure applied by the roll 50 on the tubing beyond that required to effect satisfactory welding.

While the angularity of the flat surfaces 64, 66, 68 and 70 may be varied to some extent and satisfactory results may be obtained, best results are apparently obtained when the angularity of the flat surfaces is that previously specified.

While the embodiment of the present invention as herein disclosed constitutes a preferred form, it is to be understood that other forms might be adopted.

What is claimed is as follows:

1. In an electric welding apparatus having a pair of rotatable electrode disks connected with a suitable source of electric current and separated axially from each other by a space so that said disks are not electrically connected, said disks being cut away adjacent said space so as to form a peripheral groove adapted to receive a round tube having a butt seam to be welded, means for holding the tube against the electrodes with the seam to be welded in alignment with said space and with a substantially constant pressure, and means for preventing rotation of the tube being welded during the welding operation, said means comprising a plurality of flat surfaces formed on the cut-away portions of said electrodes which form the groove and against which said tubing is held by the pressure applying means.

2. In an electric welding apparatus having a pair of rotatable electrode disks connected with a suitable source of electric current and separated axially from each other by a space so that said disks are not electrically connected, said disks being cut away adjacent said space so as to form a peripheral groove adapted to receive a round tube having a butt seam to be welded, means for holding the tube against the electrodes with the seam to be welded in alignment with said space and with a substantially constant pressure, and means for preventing rotation of the tube being welded during the welding operation, said means comprising a plurality of flat surfaces formed on the cut-away portions of said electrodes which form the groove and against which said tubing is held by the pressure applying means, said flat surfaces lying at different angles to the axis of the electrode disks.

3. In an electric welding apparatus having a pair of rotatable electrode disks connected with a suitable source of electric current and separated axially from each other by a space so that said disks are not electrically connected, said disks being cut away adjacent said space so as to form a peripheral groove adapted to receive a round tube having a butt seam to be welded, means for holding the tube against the electrodes with the seam to be welded in alignment with said space and with a substantially constant pressure, and a plurality of flat surfaces formed on the cut-away portions of the electrode which form the groove and against which the tubing is held by the pressure applying means, said flat surfaces lying at angles of approximately 9, 30, 60 and 90 degrees to the axis of said electrodes.

References Cited in the file of this patent

UNITED STATES PATENTS

| | | |
|---|---|---|
| 2,181,652 | Caputo | Nov. 28, 1939 |
| 2,196,106 | Darner | Apr. 2, 1940 |
| 2,293,846 | Nichols | Aug. 25, 1942 |
| 2,492,572 | Hahn et al. | Dec. 27, 1949 |